United States Patent [19]
Dyett et al.

[11] Patent Number: 5,097,941
[45] Date of Patent: Mar. 24, 1992

[54] CONVEYING ROD-LIKE ARTICLES

[75] Inventors: Derek H. Dyett, High Wycombe; Dennis Graham-Troll, Chinnor; Adrian Styles, Thame; Robert E. Williams, High Wycombe, all of England

[73] Assignee: Molins PLC, United Kingdom

[21] Appl. No.: 549,075

[22] Filed: Jul. 6, 1990

[30] Foreign Application Priority Data

Jul. 6, 1989 [GB] United Kingdom ............... 8915456

[51] Int. Cl.⁵ .......................................... B65G 47/26
[52] U.S. Cl. .................................... 198/457; 198/689.1
[58] Field of Search .............................. 198/457, 689.1

[56] References Cited

U.S. PATENT DOCUMENTS

| | | | |
|---|---|---|---|
| 3,575,276 | 4/1971 | Rupert | 198/457 X |
| 3,854,567 | 12/1974 | Poupin et al. | 198/689.1 X |
| 4,241,822 | 12/1980 | Molins et al. | 198/457 X |
| 4,318,943 | 3/1982 | Veenstra | 198/457 X |
| 4,550,821 | 11/1985 | Horie et al. | 198/689.1 X |
| 4,572,352 | 2/1986 | Dyett et al. | 198/457 |
| 4,773,522 | 9/1988 | Lenhart | 198/689.1 X |

FOREIGN PATENT DOCUMENTS 2614350 10/1976 Fed. Rep. of Germany ... 198/689.1

Primary Examiner—D. Glenn Dayoan
Attorney, Agent, or Firm—Antonelli, Terry, Stout & Kraus

[57] ABSTRACT

In a conveying system for a stream of rod-like articles in multi-layer stack formation, in which system the stream is moved along a path which is curved in a generally horizontal plane, suction is applied to the hub (30) of a turntable (10) for the stream, in order to draw the ends of the articles (16) against the hub and thereby help to maintain alignment of the articles during conveyance on the turntable. Further control, particularly for the uppermost articles, may be provided by a series of bristles (44) urged into contact with the articles on the turntable (10) by a guide rod (46). The system may be usefully employed in a filter cigarette assembling machine, for turning one of two streams of filter cigarettes issuing from the machine so that it may be merged with the other stream with the filter ends of the cigarettes in the two streams facing in the same direction.

29 Claims, 4 Drawing Sheets

CONVEYING ROD-LIKE ARTICLES

BACKGROUND OF THE INVENTION

This invention relates to conveying rod-like articles around a curved path. The invention is particularly useful in the tobacco industry, where it is often required to move a stream of cigarettes or cigarette filter rods in multi-layer stack formation between different processing machines.

It is known to move a substantially horizontal stream of rod-like articles in multi-layer stack formation around a relatively small radius curve by use of an inclined or banked conveying surface supporting the stream on the curve. UK Patent Specification No. 2007964 discloses an arrangement of this type. The arrangement may be usefully employed for tip turning of filter cigarettes.

In a known type of tip turning arrangement, similar to that used in Molins PA10 Filter Cigarette Assembling Machine, parallel streams of filter cigarettes in multi-layer stack formation emerge from the assembling machine and one stream in turned through 180° by means of a rotatable disc or turntable so that the streams may be subsequently combined at a T-junction. Reference is directed to UK Patent Specification No. 2079132 for details of such a system.

The present invention is particularly but not exclusively applicable to apparatus for conveying filter cigarettes around a relatively small radius curve at the output end of a filter cigarette assembling machine and, more generally, to apparatus for conveying rod-like articles in multi-layer stack formation around a curved path. In some circumstances in such apparatus, particularly where the path extends in a generally horizontal plane with the stream supported from below, it has been found that some of the articles, particularly those articles not completely surrounded by other articles, e.g. those at the top of the stream, can become misaligned and, if not removed or aligned, can cause or require stopping of the machine or a downstream apparatus or even cause damage to the machine or downstream apparatus. An object of the invention is to provide additional control for rod-like articles passing around a curved path.

According to one aspect of the invention apparatus for conveying

SUMMARY OF THE INVENTION a stream of rod-like articles in multi-layer stack formation comprises conveyor means for moving said stream around a curved path about an axis generally transverse to articles in said stream, support means adjacent which the inner ends of the articles lie on at least part of said path, and means for urging said inner ends towards said support means so as to assist location of the articles as they move around said path. Preferably said support means acts at least partly by frictional engagement with said inner ends. Preferably said urging means comprises suction means. The support means may comprise a curved surface, and is preferably movable with said stream. The curved path preferably extends generally horizontally with the conveyor means supporting the articles from below. The conveyor means may be inclined or banked. The support means may be substantially transverse to the conveyor means. The surface of the support means may have a wear-resistant finish.

In a preferred construction the conveyor means comprises a disc or turntable, which is preferably flexible and inclined or banked on the curved path, and the support means comprises the outer surface of a rotatable hub movable with the disc. The hub may comprise a suction chamber. Suction may be transmitted to the hub internally or from an external manifold having an arcuate surface lying adjacent the path of the outer surface of the hub beyond the region of the curved path. Thus, the hub may have perforations around its circumference which, during passage adjacent the curved path, draw air inwards in response to suction applied through the perforations in the region of the suction manifold. Air drawn through the perforations draws or tends to draw the inner ends of the articles against the surface to align them in a generally radial direction and to maintain that alignment. Means may be provided for cutting off suction in a region where the stream is transferred from the curved path. Such means could comprise a flexible strip material arranged to interpose itself between the inner ends of the cigarettes and the hub, thereby both cutting off suction and physically helping to strip the articles away from the hub. More generally, where the curved path extends around only part of the circumference of a hub, means may be provided for effectively preventing suction from being transmitted to that part of the circumference of the hub which is not adjacent the curved path. Thus, said means may comprise stationary internal shielding or valving means around which the hub rotates. Particularly where suction is supplied internally to the hub (i.e. not from an external manifold), such means can reduce suction loss. The internal shielding or valving means may be substantially analogous to such means commonly used in suction drums on filter cigarette assembling machines: examples of such drums are disclosed in UK Patent Specification No. 1327773, to which reference is directed for details.

The support means could comprise band means, which could be a suction band, e.g. passing around a central hub.

In order to further control the stream on the curved path, control means contacting the stream opposite the conveyor means may be provided. The control means may comprise resilient means pressing on the stream. Thus, where the support means comprises a rotatable hub, the control means may comprise a disc lightly pressing on the articles in the region of the curved path. The periphery of the disc could be continuous or could comprise separate elements or fingers or a plurality of bristles. Preferably the control means is movable with the stream. Guide means may be provided for pressing the control means onto the stream in the region of the curved path and/or keeping the control means clear of intervening structure outside said region.

According to another aspect of the invention apparatus for conveying a stream of rod-like articles in multi-layer stack formation comprises conveyor means for moving said stream around a curved path about an axis generally transverse to the articles in said stream, and control means for contacting the stream on its side opposite the conveyor means, the control means comprising a series of closely spaced flexible and resilient elements urged into contact with said stream and movable with it, to assist in location of articles of the stream. The control means preferably comprises a rotatable disc carrying radially-extending bristles which may be urged by guide means into contact with and partially around articles of the stream.

BRIEF DESCRIPTION OF THE DRAWINGS

The invention will be further described, by way of example only, with reference to the accompanying diagrammatic drawings, in which.

DESCRIPTION OF THE PREFERRED EMBODIMENTS

Figure 1:
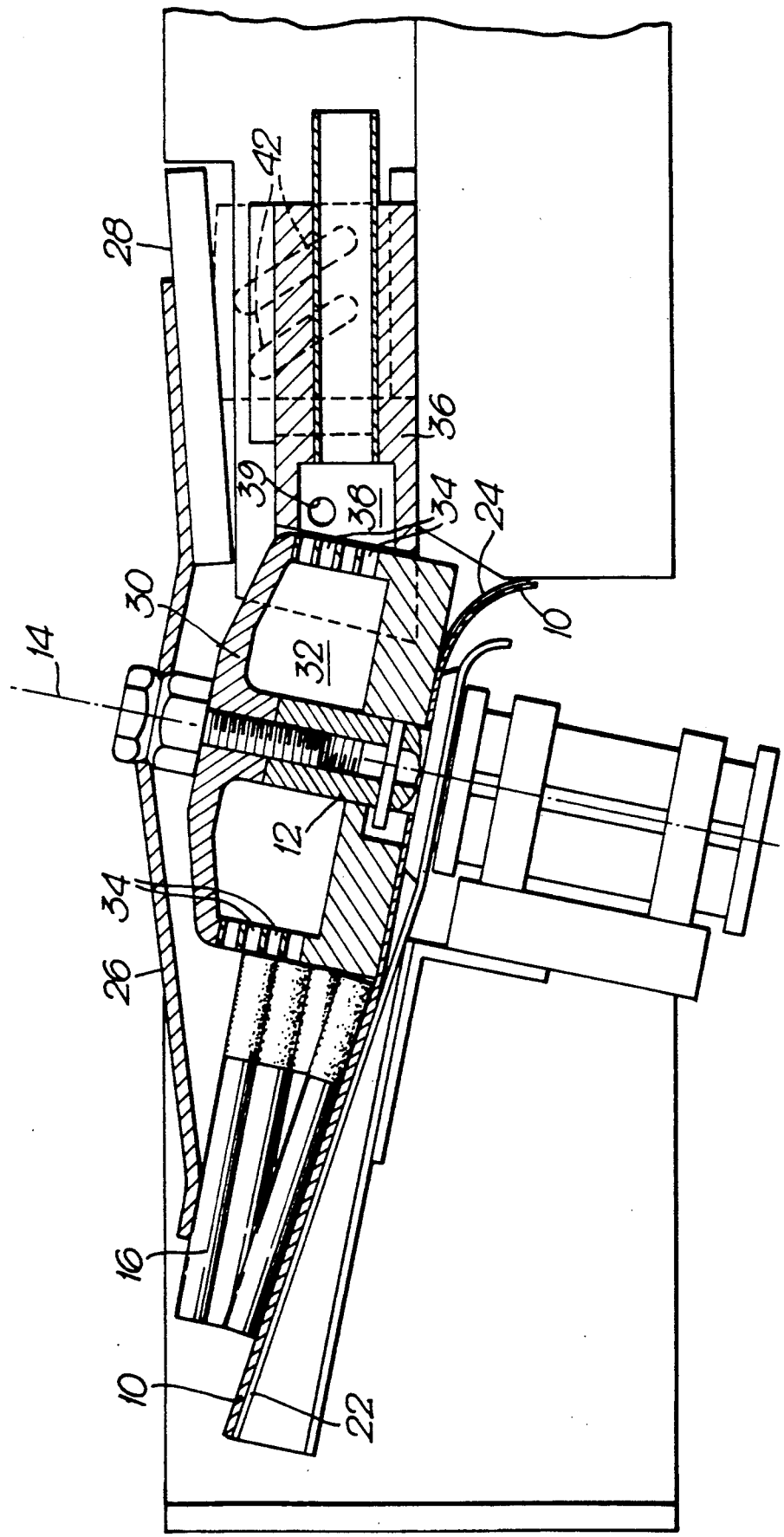
FIG. 1 is a sectional side view of a conveyor arrangement for filter cigarettes.
Figure 2:
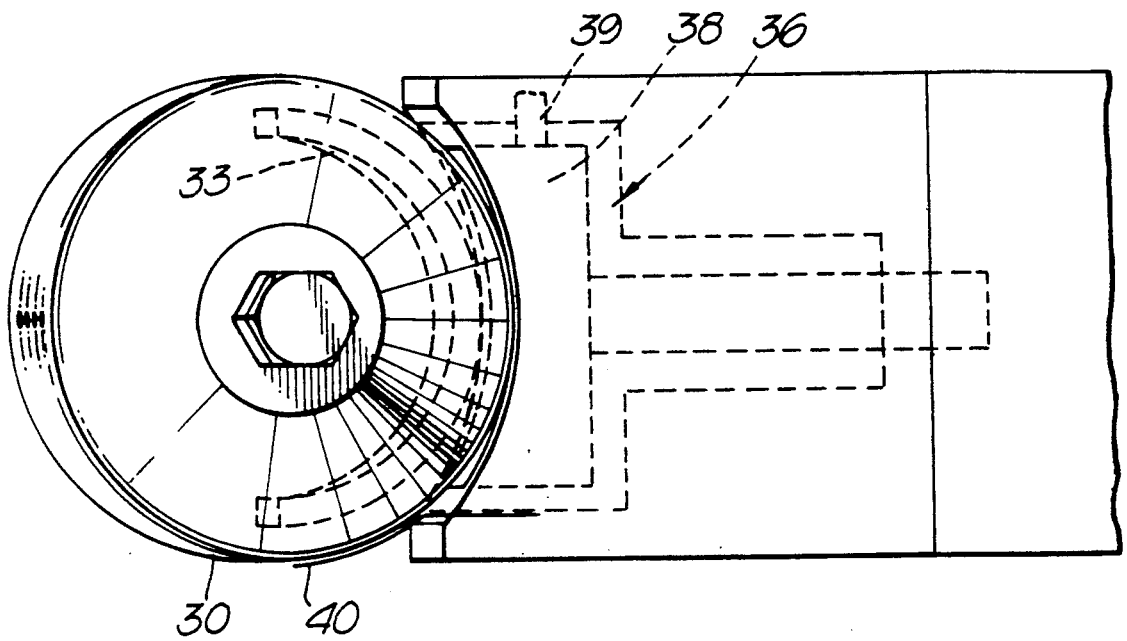
FIG. 2 is a partial plan view of the conveyor arrangement of FIG. 1.

The conveyor arrangement of FIGS. 1 and 2 comprises a flexible turntable or disc 10 carried by a shaft 12 rotatable about an axis 14 inclined to the vertical. The disc 10 is located to receive a stream of filter cigarettes 16 in multi-layer stack formation from a conveyor 18 and to transfer it to a conveyor 20, as shown schematically in FIG. 3.

During its rotation from the conveyor 18 to the conveyor 20 the disc 10 is inclined or banked by a stationary inclined surface 22. During rotation between the conveyor 20 and the conveyor 18 (i.e. when it is not conveying cigarettes) the disc 10 is guided downwards to avoid the end pulleys and other structure associated with the conveyors 18, 20. Part of a guide 24 is shown in FIG. 1: only part of the disc 10 on this side of the shaft 12 is shown in FIG. 1.

In addition to the disc 10 the shaft 12 carries an upper flexible and resilient disc 26. The disc 26 naturally assumes a conical shape so that its periphery extends down towards the cigarettes 16. In the vicinity of the conveyors 18 and 20 the disc 26 is deflected by a surface 28 over which the disc slides during rotation of the shaft 12.

A hub 30 is also connected to the shaft 12 and serves to provide an inner boundary for the filter tip ends of the cigarettes 16 being conveyed by the disc 10 between the conveyors 18 and 20. The hub 30 is hollow and contains an annular chamber 32 which communicates with a series of holes or perforations 34 in the side wall of the hub.

A stationary suction manifold 36 is arranged generally between the conveyors 18 and 20 adjacent the hub 30 and has side walls which, together with the side wall of the hub 30, define a suction chamber 38 to which suction is supplied via a pipe 39. As seen in FIGS. 1 and 2, the edges of the side walls of the manifold 36 are contoured to follow the shape of the hub 30, being therefore both curved and inclined and are spaced from it by a very small clearance so that air flow between the walls of the manifold and of the hub is severely restricted. There could be sliding contact between the hub 30 and manifold 36 but in practice this would be likely to create problems of wear and/or selection of suitable materials.

In operation, suction applied to the manifold 36 draws air from the chamber 32 in the hub 30 through the perforations 34 which for the time being are adjacent the manifold. This induces suction in the chamber 32 which in turn causes air to be drawn through the perforations 34 in that part of the hub 30 which extends between the conveyors 18 and 20 and against which lie the filter tip ends of the cigarettes 16. The suction which effectively operates on these filter tip ends draws them against the hub 30 and helps to maintain alignment of particularly the uppermost layer of cigarettes 16.

At the downstream side of the hub 30, i.e. adjacent the conveyor 20, a strip 40 of "Melinex" (Trade Mark) or similar material lies against the hub 30 as it rotates and serves to help strip off the cigarettes 16 for transfer to the conveyor 20. The strip 40 serves not only to physically assist removal of cigarettes 16 from the hub 30 by interposing itself between the ends of the cigarettes and the hub but also effectively to cut off the suction drawing the cigarettes against the hub.

The surface of the hub 30 is preferably anodized, to reduce the effects of wear caused by the ends of the cigarettes 16 being drawn against it.

The inclination of the shaft 12 may be varied, and indeed the shaft may be vertical. The manifold 36 is adjustably mounted by bolts passing through arcuate slots 42, so that it may be maintained in alignment with the hub 30 following any adjustment of the inclination of the shaft 12.

In principle, and particularly where the shaft 12 is vertical, it would be possible to arrange a suction band extending around the hub 30 and for a short distance up and downstream of the hub, so as to assist in transferring cigarettes 16 from and to the conveyors 18 and 20 respectively.

Suction may be supplied internally to the chamber 32, e.g. by way of a pipe communicating directly with the interior of the hub 30 through a rotary seal. A stationary shield may be arranged inside the hub 30, the shield extending around the chamber 32 to prevent suction reaching the perforations 34 during rotation from the conveyor 20 to the conveyor 18. The position of a typical shield 33, extending around about 180°, is shown in FIG. 2: this is shown in FIG. 2 for illustrative purposes only, and would not be used in conjunction with the external manifold 38.

Figure 3:
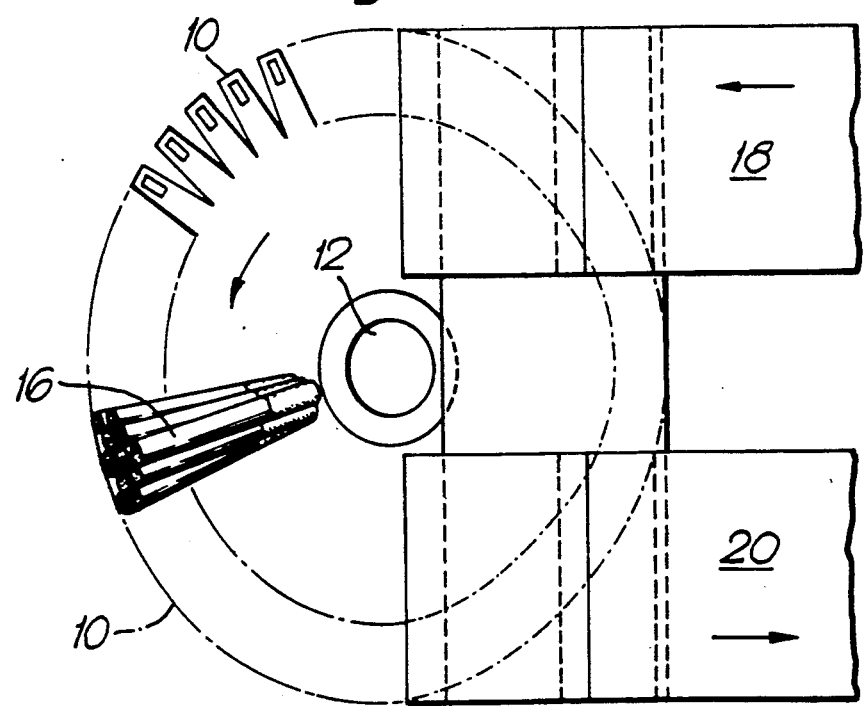
FIG. 3 is a plan view of a conveyor arrangement similar to that of FIG. 1.
Figure 4:
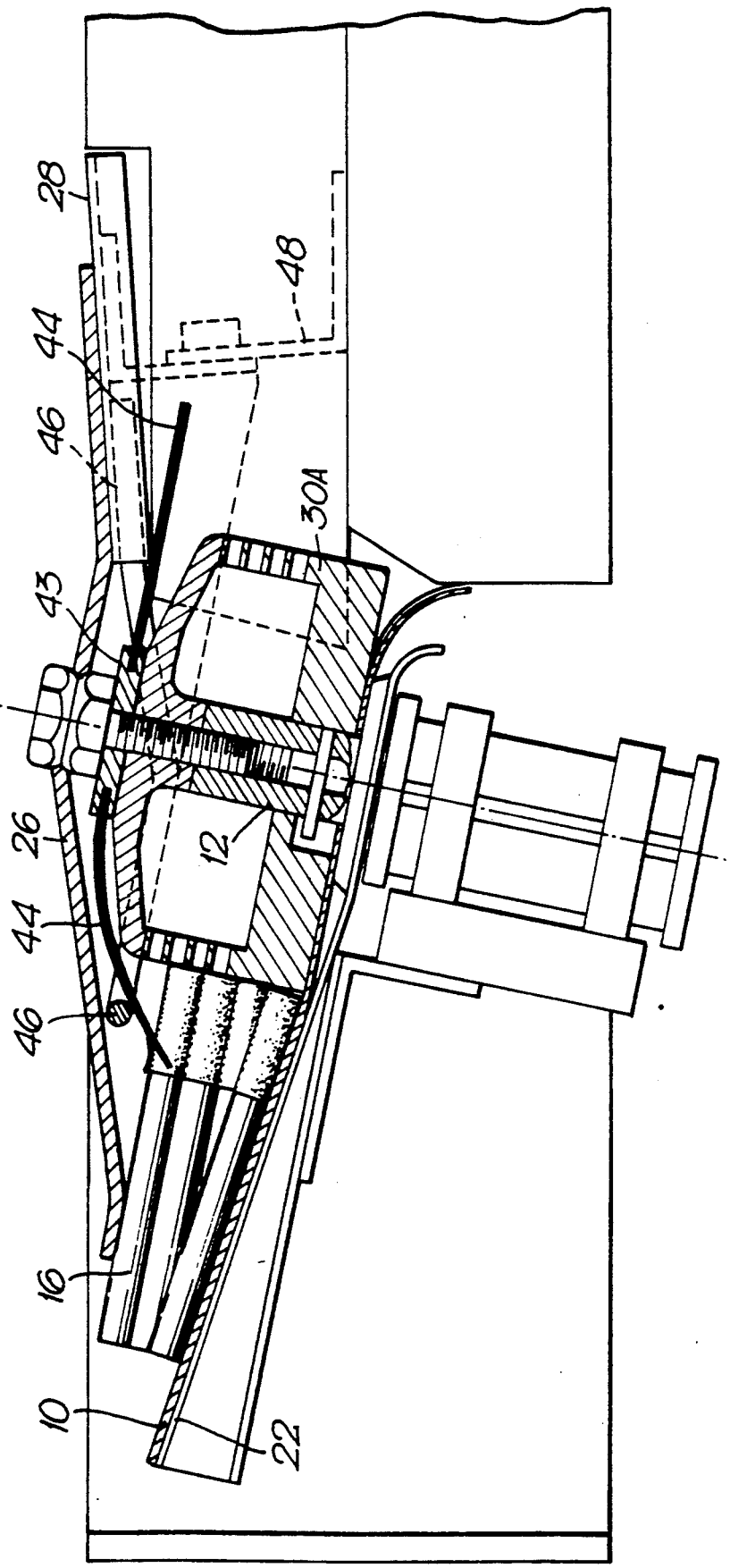
FIG. 4 is a sectional side view of another conveyor arrangement for filter cigarettes.
Figure 5:
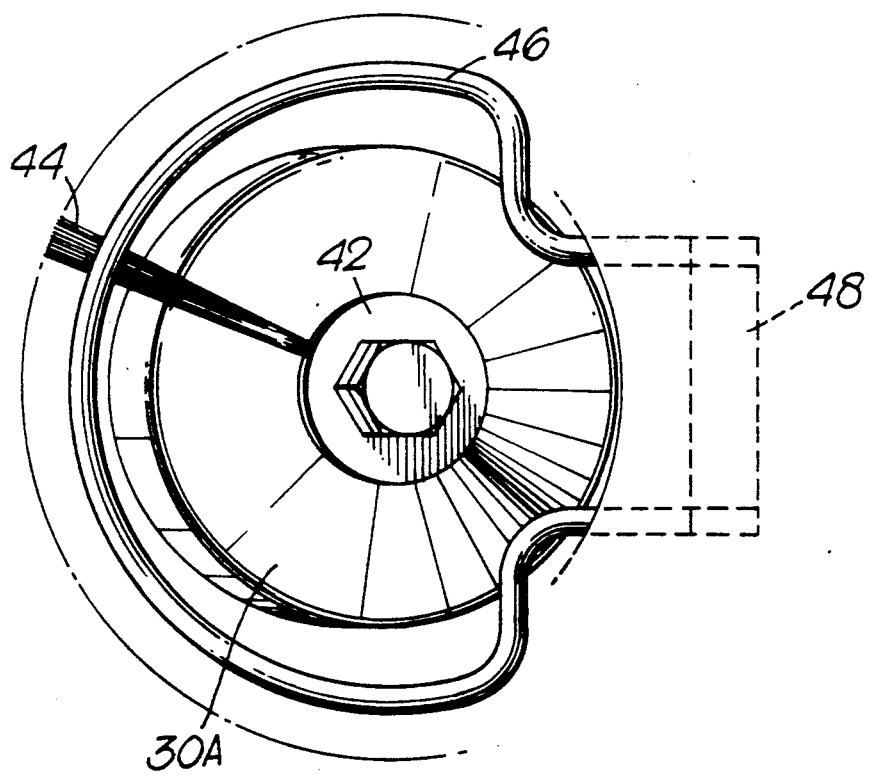
FIG. 5 is a partial plan view of the conveyor arrangement of FIG. 4.

FIGS. 4 and 5 show a different conveyor arrangement, including many parts similar to those in the conveyor arrangement of FIGS. 1-3 and which have been given similar reference numbers and are not described further. The shaft 12 carries a hub 30A which, as shown, does not cooperate with a suction manifold. Above the hub 30A the shaft 12 carries a flange 43 from which extends radially a plurality of closely-spaced bristles 44 forming an annular array around the flange. A stationary guide comprising a curved rod 46 supported by a bracket arrangement 48 deflects the bristles 44 during that part of their rotational path extending from the conveyor 18 to the conveyor 20. As shown in FIG. 4, the bristles 44 thereby rest on the filter tip ends of the uppermost layer of cigarettes 16, some of the bristles extending into the spaces between cigarettes in the upper layer so that they partially surround cigarettes in that layer. The effect is that the upper layer of cigarettes 16 is well-located by the bristles 44 during conveyance by the disc 10, so that the possibility of misaligned cigarettes is reduced. During that part of their rotational path extending from the region of the conveyor 20 to the region of conveyor 18 the bristles 44 are not contacted by the guide rod 46, so that they extend radially in this region, as shown in FIG. 4. Note that the resilient disc 26 continues to contact the upper layer of cigarettes at positions spaced from those in which they are contacted by the bristles 44: the bristles 44 could be used without the disc 26, however.

The hub 30A may be identical to the hub 30 and cooperate with a suction manifold 36 or with an internal suction supply. In other words, the arrangements of FIGS. 1-3 and 4, 5 may be embodied in a single apparatus, which may include any modifications disclosed herein.

We claim:

1. Apparatus for conveying a stream of rod-like articles in multi-layer stack formation, comprising conveyor means for moving said stream around a curved path about an axis generally transverse to articles in said stream, support means adjacent which the inner ends of the articles lie on at least part of said path, and means acting on the ends of the articles for urging said inner ends towards said support means so as to assist location of the articles as they move around said path.

2. Apparatus as claimed in claim 1, wherein said support means and said inner ends are in frictional engagement.

3. Apparatus as claimed in claim 2, wherein the support means has a wear-resistant finish.

4. Apparatus as claimed in claim 1, wherein said means acting on the ends of the articles includes pneumatic means.

5. Apparatus for conveying a stream of rod-like articles in multi-layer stack formation, comprising conveyor means for moving said stream around a curved path about an axis generally transverse to articles in said stream, support means adjacent which the inner ends of the articles lie on at least part of said path, and means for urging said inner ends towards said support means so as to assist location of the articles as they move around said path, wherein said urging means includes suction means.

6. Apparatus as claimed in claim 5, wherein the support means comprises a curved surface movable with said stream.

7. Apparatus as claimed in claim 6, wherein said curved path extends generally horizontally and said conveyor means supports the articles from below.

8. Apparatus as claimed in claim 7, wherein said conveyor means is inclined on said curved path.

9. Apparatus as claimed in claim 6, wherein the support means is substantially transverse to the conveyor means.

10. Apparatus as claimed in claim 7, wherein the conveyor means comprises a flexible disc.

11. Apparatus as claimed in claim 10, wherein the support means comprises an outer surface of a rotatable hub movable with the disc.

12. Apparatus as claimed in claim 11, wherein said suction means includes at least one suction passage in the outer surface of the hub and communicating with a suction chamber contained in the hub.

13. Apparatus as claimed in claim 11, wherein said suction means includes a series of perforations formed around the circumference of said hub, which perforations transmit suction to draw said inner ends towards said hub.

14. Apparatus as claimed in claim 13, including an external suction manifold having an arcuate surface lying adjacent the path of the outer circumference of the hub beyond the region of the curved path, whereby suction is transmitted to said suction chamber from said manifold through said perforations.

15. Apparatus as claimed in claim 13, including stationary shielding means within said suction chamber for restricting transmission of suction to said perforations when the latter are not adjacent the curved path.

16. Apparatus as claimed in claim 6, further including means for cutting off suction in a region where the stream is transferred from the curved path.

17. Apparatus as claimed in claim 16 wherein said means for cutting off suction comprises a flexible strip arranged to interpose itself between the inner ends of the articles and the hub in said curved surface.

18. Apparatus for conveying a stream of rod-like articles in multi-layer stack formation, comprising conveyor means for moving said stream around a curved path about an axis generally transverse to articles in said stream, support means adjacent which the inner ends of the articles lie on at least part of said path, and means for urging said inner ends towards said support means so as to assist location of the articles as they move around said path, wherein the support means comprises a suction band.

19. Apparatus as claimed in claim 18, wherein said support means further includes a rotatable hub movable with said conveyor means, wherein said suction band passes over the surface of said hub so that suction is applied to the inner ends of said articles via said suction band as the articles are conveyed by said conveyor means.

20. Apparatus as claimed in claim 7, further including control means for controlling the stream opposite said conveyor means.

21. Apparatus as claimed in claim 20, wherein the control means comprises resilient means pressing on the stream.

22. Apparatus as claimed in claim 21, wherein the support means comprises a rotatable hub, the control means comprising a disc lightly pressing on the stream in the region of the curved path.

23. Apparatus as claimed in claim 22, wherein the periphery of the disc is continuous.

24. Apparatus as claimed in claim 22, wherein the disc comprises a plurality of closely spaced flexible and resilient elements.

25. Apparatus as claimed in claim 20, wherein the control means is movable with the stream, and guide means is provided for pressing the control means onto the stream in the region of the curved path.

26. Apparatus as claimed in claim 20, wherein the control means is movable with the stream, and guide means is provided for keeping the control means clear of intervening structure outside the region of the curved path.

27. Apparatus for conveying a stream of rod-like articles in multi-layer stack formation comprising conveyor means for moving said stream around a curved path about an axis generally transverse to the articles in said stream, and control means for contacting the stream on its side opposite the conveyor means, the control means comprising a series of closely spaced flexible and resilient elements urged into contact with said stream and movable with it, to assist in location of articles of the stream.

28. Apparatus as claimed in claim 27, wherein the control means comprises a rotatable disc carrying radially-extending bristles.

29. Apparatus as claimed in claim 28, further including guide means for urging said bristles into contact with and partially around articles of the stream.

* * * * *